(12) United States Patent  
Beall et al.

(10) Patent No.: US 11,332,405 B2
(45) Date of Patent: May 17, 2022

(54) MAGNESIUM ALUMINOSILICATE GLASS CERAMICS

(71) Applicant: CORNING INCORPORATED, Corning, NY (US)

(72) Inventors: George Halsey Beall, Big Flats, NY (US); Heather Debra Boek, Corning, NY (US); Ling Cai, Painted Post, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/262,923

(22) PCT Filed: Jul. 9, 2019

(86) PCT No.: PCT/US2019/040928
§ 371 (c)(1),
(2) Date: Jan. 25, 2021

(87) PCT Pub. No.: WO2020/023205
PCT Pub. Date: Jan. 30, 2020

(65) Prior Publication Data
US 2021/0139367 A1 May 13, 2021

Related U.S. Application Data

(60) Provisional application No. 62/701,913, filed on Jul. 23, 2018.

(51) Int. Cl.
*C03C 10/00* (2006.01)
*C03C 4/16* (2006.01)

(52) U.S. Cl.
CPC ............ *C03C 10/0045* (2013.01); *C03C 4/16* (2013.01); *C03C 10/0054* (2013.01); *C03C 2203/10* (2013.01)

(58) Field of Classification Search
CPC ... C03C 10/0045; C03C 4/16; C03C 10/0054; C03C 2203/10
See application file for complete search history.

(56) References Cited

U.S. PATENT DOCUMENTS

| | | | | |
|---|---|---|---|---|
| 3,689,293 A | * | 9/1972 | Beall | C03C 10/16 501/3 |
| 5,958,807 A | * | 9/1999 | Kumar | H01L 23/15 501/5 |

(Continued)

FOREIGN PATENT DOCUMENTS

| | | |
|---|---|---|
| CA | 1109664 A | 9/1981 |
| CN | 1059182 A | 3/1992 |

(Continued)

OTHER PUBLICATIONS

Chen et al., "Microwave Dielectric Properties of Glass-Ceramic Composites For Low Temperature Co-Firable Ceramics", Materials Chemistry and Physics, vol. 79 2003, pp. 129-134.

(Continued)

*Primary Examiner* — Travis M Figg

(57) ABSTRACT

A glass-ceramic includes $SiO_2$ in a range of 40 mol. % to 80 mol. %; $Al_2O_3$ in a range of 5 mol. % to 20 mol. %; MgO in a range of 5 mol. % to 20 mol. %; and at least one of $B_2O_3$, ZnO, and $TiO_2$, each in a range of 0 mol. % to 10 mol. %, such that the glass-ceramic further comprises a magnesium aluminosilicate crystalline phase at a concentration in a range of 5 wt. % to 80 wt. % of the glass-ceramic.

20 Claims, 5 Drawing Sheets

(56) References Cited

U.S. PATENT DOCUMENTS

| | | | |
|---|---|---|---|
| 6,878,464 | B2 | 4/2005 | Moriya et al. |
| 7,544,629 | B2 | 6/2009 | Ito et al. |
| 7,687,015 | B2 | 3/2010 | Watanabe et al. |
| 8,394,732 | B2 | 3/2013 | Alharbi et al. |
| 8,592,041 | B2 | 11/2013 | Adachi et al. |
| 8,664,130 | B2 | 3/2014 | Beall et al. |
| 8,664,131 | B2 | 3/2014 | Beall et al. |
| 8,697,591 | B2 | 4/2014 | Li et al. |
| 8,925,250 | B2 | 1/2015 | Parker |
| 9,133,054 | B2 | 9/2015 | Beall et al. |
| 2003/0209539 | A1* | 11/2003 | Dalton ............... B01J 19/087 219/634 |
| 2006/0075782 | A1 | 4/2006 | Watanabe et al. |
| 2008/0248316 | A1* | 10/2008 | Goto ............... C03B 27/02 428/426 |
| 2011/0223399 | A1 | 9/2011 | Adachi et al. |
| 2012/0021890 | A1 | 1/2012 | Alharbi et al. |
| 2012/0149542 | A1 | 6/2012 | Alharbi et al. |
| 2013/0274085 | A1 | 10/2013 | Beall et al. |
| 2013/0296155 | A1 | 11/2013 | Beall et al. |
| 2014/0057092 | A1 | 2/2014 | Beall et al. |
| 2014/0066285 | A1 | 3/2014 | Beall et al. |
| 2015/0321947 | A1 | 11/2015 | Beall et al. |
| 2017/0240460 | A1* | 8/2017 | Boek ............... C03B 32/02 |
| 2018/0037493 | A1* | 2/2018 | Schneider ........... C04B 35/195 |
| 2018/0057395 | A1* | 3/2018 | Liu ............... C03B 1/00 |

FOREIGN PATENT DOCUMENTS

| | | |
|---|---|---|
| CN | 1060455 A | 4/1992 |
| CN | 1186781 A | 7/1998 |
| CN | 1202469 A | 12/1998 |
| CN | 1246463 A | 3/2000 |
| CN | 1458101 A | 11/2003 |
| CN | 101148323 A | 3/2008 |
| CN | 103771711 A | 5/2014 |
| CN | 104310980 A | 1/2015 |
| CN | 104556701 A | 4/2015 |
| CN | 104619665 A | 5/2015 |
| CN | 105800939 A | 7/2016 |
| CN | 106927792 A | 7/2017 |
| EP | 1113459 A2 | 7/2001 |
| EP | 2266933 A1 | 12/2010 |
| EP | 2836470 A1 | 2/2015 |
| JP | 2000-086288 A | 3/2000 |
| JP | 2000-327428 A | 11/2000 |
| JP | 2002-220255 A | 8/2002 |
| JP | 2002-220256 A | 8/2002 |
| JP | 2002-338295 A | 11/2002 |
| JP | 2003-073141 A | 3/2003 |
| JP | 2003-128431 A | 5/2003 |
| JP | 2004-016560 A | 1/2004 |
| JP | 2004-277276 A | 10/2004 |
| JP | 2005-306714 A | 11/2005 |
| JP | 2006-298716 A | 11/2006 |
| JP | 4229045 B2 | 2/2009 |
| JP | 5057644 B2 | 10/2012 |
| RU | 2009142810 A | 5/2011 |
| RU | 2446509 C2 | 3/2012 |
| TW | 201402490 A | 1/2014 |
| WO | 99/21803 A2 | 5/1999 |
| WO | 2010/021746 A1 | 2/2010 |
| WO | 2013/155281 A1 | 10/2013 |

OTHER PUBLICATIONS

Giess et al., "Microstructure and Dielectric Properties of Mullite Ceramics", vol. 15, The American Ceramic Society, Westerville, Ohio, 1990, pp. 67-177.

International Search Report and Written Opinion of the International Searching Authority; PCT/US2019/040928 dated Oct. 22, 2019, 9 pages; European Patent Office.

Li et al., "Low Temperature Sintering of Low-Loss $ZnTiO_3$ Microwave Dielectric Ceramics with ZnB—Si Glass", 2015, Journal of Alloys and Compounds, 19 pages.

Rajput et al., "Microwave Dielectric Properties of $(1 - x)Mg0.95Zn0.05TiO_3$—$(x)Ca0.6La0.8/3TiO_3$ Ceramic Composites", Journal of Alloys and Compounds, vol. 552, No. Mar. 5, 2013, pp. 219-226.

Sebastian et al., "Low Loss Dielectric Materials for LTCC Application", International Materials Reviews, vol. 53, No. 2, Mar. 2008, pp. 57-90.

Surendran et al., "A Low Loss, Dielectric Substrate in $ZnAl_2O_4$—$TiO_2$ System for Microelectronic Applications", Journal of Applied Physics, vol. 98, 2005, pp. 044101-1-044101-5.

Yuan-Bin Chen, "The Dielectric Properties of $0.85MgTiO_3$—$0.15Ca0.6La0.8/3TiO_3$ with ZnO Additions for Microwave Applications", Journal of Alloys and Compounds vol. 477, No. 1-2, May 27, 2009, pp. 883-887.

\* cited by examiner

MAGNESIUM ALUMINOSILICATE GLASS CERAMICS

CROSS-REFERENCE TO RELATED APPLICATIONS

This application claims the benefit of priority under 35 U.S.C. § 371 of International Patent Application Serial No. PCT/US2019/040928, filed on Jul. 9, 2019, which claims the benefit of priority under 35 U.S.C. § 119 of U.S. Provisional Application Ser. No. 62/701,913, filed on Jul. 23, 2018, the contents of both of which are relied upon and incorporated herein by reference in their its entirety.

BACKGROUND

1. Field

The disclosure relates to glass-ceramic compositions and articles, and more particularly to magnesium aluminosilicate glass-ceramic compositions and articles with low dielectric loss characteristics.

2. Technical Background

As digital technologies continue to expand, data connectivity and processing rates will experience growth from about 1 Gbits/sec to tens of Gbits/sec. Corresponding electronic device technologies required to achieve these data rates likely will result in expanding signal transmission and receiving frequencies from about 1 gigahertz (GHz) to tens of GHz.

Currently available materials equipped to handle these increases in bandwidth are insufficient due to electrical and mechanical properties. For example, polymers (e.g., Teflon) degrade at high temperatures and are difficult to bond with metal films in antennas, semiconductor circuits and signal transmission structures of the electronic device. Others, such as ceramics (e.g., alumina) or glasses (e.g., aluminosilicates) either do not possess the appropriate combination of loss tangent and dielectric constant characteristics or may comprise alkali components which may undesirably diffuse into subsequently-deposited thin films.

The disclosure discloses magnesium aluminosilicate glass-ceramic compositions and articles with improved dielectric loss characteristics.

SUMMARY

In some embodiments, a glass-ceramic comprises: $SiO_2$ in a range of 40 mol. % to 80 mol. %; $Al_2O_3$ in a range of 5 mol. % to 20 mol. %; MgO in a range of 5 mol. % to 20 mol. %; and at least one of $B_2O_3$, ZnO, and $TiO_2$, each in a range of 0 mol. % to 10 mol. %, wherein the glass-ceramic further comprises a magnesium aluminosilicate crystalline phase at a concentration in a range of 5 wt. % to 80 wt. % of the glass-ceramic.

In one aspect, which is combinable with any of the other aspects or embodiments, the glass-ceramic comprises: $SiO_2$ in a range of 55 mol. % to 75 mol. %; $Al_2O_3$ in a range of 9 mol. % to 15 mol. %; and MgO in a range of 7 mol. % to 15 mol. %.

In one aspect, which is combinable with any of the other aspects or embodiments, the glass-ceramic comprises: at least two of $B_2O_3$, ZnO, and $TiO_2$, each in a range of 0 mol. % to 10 mol. %.

In one aspect, which is combinable with any of the other aspects or embodiments, the magnesium aluminosilicate crystalline phase comprises at least one of $MgAl_2O_4$/$ZnAl_2O_4$, $MgTiO_5$, $TiO_2$, $MgSiO_3$, $ZrO_2$, $Mg_2Al_4Si_5O_{18}$, Mg-stuffed β-quartz, or $SiO_2$.

In one aspect, which is combinable with any of the other aspects or embodiments, the magnesium aluminosilicate crystalline phase comprises at least two of $MgAl_2O_4$/$ZnAl_2O_4$, $MgTiO_5$, $TiO_2$, $MgSiO_3$, $ZrO_2$, $Mg_2Al_4Si_5O_{18}$, Mg-stuffed β-quartz, or $SiO_2$.

In one aspect, which is combinable with any of the other aspects or embodiments, the magnesium aluminosilicate crystalline phase comprises at least three of $MgAl_2O_4$/$ZnAl_2O_4$, $MgTiO_5$, $TiO_2$, $MgSiO_3$, $ZrO_2$, $Mg_2Al_4Si_5O_{18}$, or Mg-stuffed β-quartz, or $SiO_2$.

In one aspect, which is combinable with any of the other aspects or embodiments, the magnesium aluminosilicate crystalline phase comprises at least $MgAl_2O_4$/$ZnAl_2O_4$ and $MgTiO_5$.

In one aspect, which is combinable with any of the other aspects or embodiments, the magnesium aluminosilicate crystalline phase further comprises: $ZrO_2$; $TiO_2$; $MgSiO_3$; $TiO_2$ and $ZrO_2$; $TiO_2$ and $MgSiO_3$; $ZrO_2$ and $MgSiO_3$; $TiO_2$, $MgSiO_3$, and $Mg_2Al_4Si_5O_{18}$; $TiO_2$, $MgSiO_3$, and Mg-stuffed β-quartz; or $TiO_2$, $MgSiO_3$, $Mg_2Al_4Si_5O_{18}$, and Mg-stuffed β-quartz.

In one aspect, which is combinable with any of the other aspects or embodiments, the glass-ceramic is configured for a dielectric loss of 0.001 or less for signals having a frequency of 1 GHz or less.

In one aspect, which is combinable with any of the other aspects or embodiments, the glass-ceramic is configured for a dielectric loss of 0.001 or less for signals having a frequency of 10 GHz or less.

In one aspect, which is combinable with any of the other aspects or embodiments, the glass-ceramic is configured for a dielectric loss of 0.001 or less for signals having a frequency of 10 GHz or more.

In one aspect, which is combinable with any of the other aspects or embodiments, the glass-ceramic is configured for a dielectric loss of 0.001 or less for signals having a frequency in a range of 25 GHz to 60 GHz.

In one aspect, which is combinable with any of the other aspects or embodiments, the glass-ceramic is configured for a dielectric constant below 6.0.

In one aspect, which is combinable with any of the other aspects or embodiments, the glass-ceramic is configured as a two-dimensional plane having at least one minimum dimension of 1 cm.

In one aspect, which is combinable with any of the other aspects or embodiments, an antenna, semiconductor circuit, or signal transmission structure comprises any of the glass-ceramics disclosed herein.

In some embodiments, a method of forming glass-ceramics comprises: mixing a plurality of oxides to form a precursor composition; melting the precursor composition at a temperature of at least 1500° C. for a time in a range of 1 hr to 24 hrs; annealing at a temperature of at least 500° C.; and ceramming at a temperature in a range of 750° C. to 1150° C. for a time in a range of 1 hr to 10 hrs.

In one aspect, which is combinable with any of the other aspects or embodiments, the plurality of oxides includes at least two of $SiO_2$, $Al_2O_3$, MgO, $B_2O_3$, ZnO, $TiO_2$, or $ZrO_2$.

In one aspect, which is combinable with any of the other aspects or embodiments, the method further comprises: drigaging the melt prior to the step of annealing.

In one aspect, which is combinable with any of the other aspects or embodiments, the mixing and melting are repeated a plurality of times.

In one aspect, which is combinable with any of the other aspects or embodiments, the ceramming is conducted at a temperature in a range of 800° C. to 1000° C. for a time in a range of 2 hrs to 6 hrs.

BRIEF DESCRIPTION OF THE DRAWINGS

The disclosure will become more fully understood from the following detailed description, taken in conjunction with the accompanying figures, in which.

DETAILED DESCRIPTION

Figure 1:
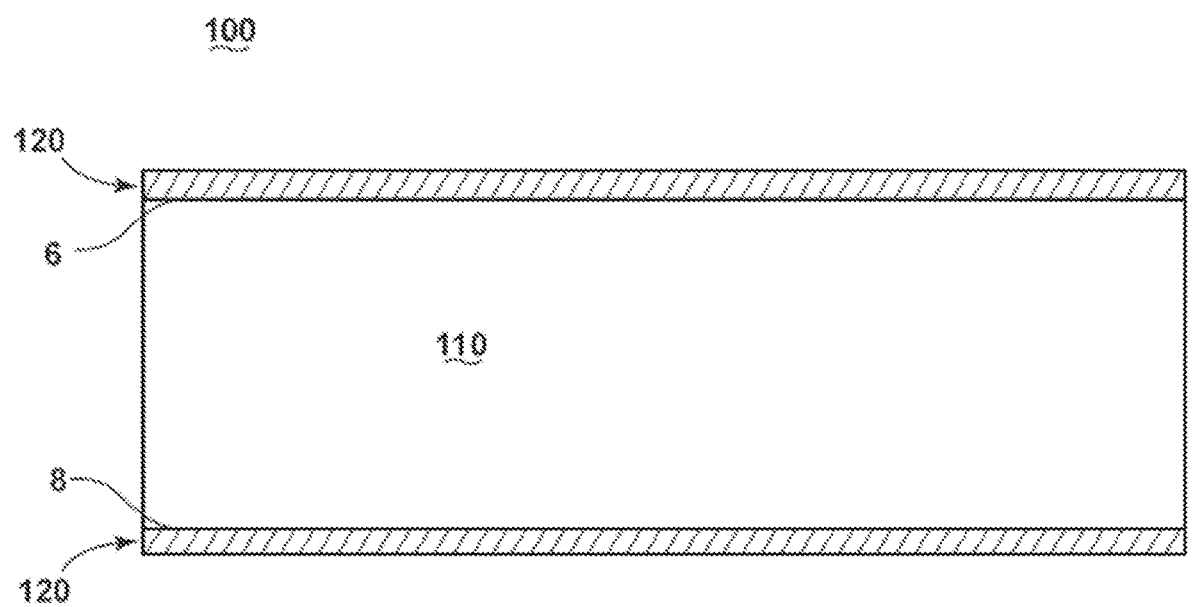
FIG. 1 illustrates a schematic cross-section view of a glass-ceramic laminate article, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

As signal frequencies increase to accommodate increased data processing rates, technical specifications and requirements related to absorption loss associated with the insulating materials employed in electronic devices becomes more important. For example, as higher frequency communication signals are used, the signals must pass through various physical barriers which might attenuate or block these signals. Examples of physical barriers are electrically-insulating substrates used in electronic circuit fabrication (e.g., antennas, semiconductor circuits, signal transmission structures). These barriers and substrates play a role in the electrical performance of electronic devices since the barriers and substrates are configured to transmit high frequency signals or are situated close to fields associated with increased signal frequencies transmitted by the devices. Because these physical barrier materials are not perfect insulators, they are associated with dielectric loss that affects the intensity of signals transmitted through them.

In other words, higher loss tangents physically represent a greater capacity of a material to convert electromagnetic energy into heat energy. For an electromagnetic wave (EM) propagating through the material of a device, a conversion of its electromagnetic energy into heat energy results in a decreased intensity of the signal frequencies transmitted by the devices, thereby degrading electrical performance.

The dissipation loss means the radiation of energy when EM is propagating,

The compositions and substrates presented herein, particularly glass-ceramic compositions, are suitable for electronic devices, electronic device substrates, and other comparable applications that can enable higher frequency communication in devices without significant reductions in performance as it relates to other non-electrical device requirements. Moreover, the glass-ceramic compositions may be formed with relatively low-cost manufacturing processes, such as up-draw formation processes, rolled sheet processes, float processes, and down-draw (e.g., slot-draw, fusion-draw, etc.) formation processes.

Definitions

The term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

The terms "glass article," "glass articles," "glass-ceramic article" and "glass-ceramic articles" are used in their broadest sense to include any object made wholly or partly of glass and/or glass-ceramics. Unless otherwise specified, all compositions are expressed in terms of mole percent (mol %).

The term "coefficient of thermal expansion (CTE)" represents a value averaged over a temperature range from 20° C. to 300° C., unless otherwise specified. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

The terms "relatively low CTE" and "low CTE" are used interchangeably in the disclosure regarding clad layers fabricated from a glass-ceramic composition (e.g., prior to ion-exchange) having a CTE that is lower than the CTE of a core layer, as employed in embodiments of glass-ceramic laminate articles with a core glass layer and clad glass-ceramic layers. In some examples, the CTE of the clad layers, as comprising glass-ceramic compositions of the disclosure, is lower than the CTE of the core layer by at least about $5 \times 10^{-7}$/° C.

The terms "mechanically strengthened" and "mechanical strengthening" are used in relation to the laminated glass-ceramic structures of the disclosure to mean a glass-ceramic or laminate that has been formed by laminating a high CTE core glass to low CTE clad glass-ceramic layer(s), thereby creating compressive stresses in the clad layers when the laminate is cooled following lamination. These compressive stresses can offset externally applied mechanical stresses (e.g., as applied through manufacturing-related handling, application-related loading and other sources), which have the net effect of strengthening the laminate.

The terms "loss tangent", "dielectric loss tangent" and "dielectric loss" are used interchangeably in this disclosure to refer to the inherent dissipation of electromagnetic energy (e.g., heat) afforded by a particular glass-ceramic composition, layer, or laminated structure associated with embodiments of this disclosure. The loss tangent can be parameterized in terms of either the loss angle ($\delta$) or the corresponding loss tangent (tan $\delta$). Permittivity is the ability of a substance, such as the glass-ceramics of the disclosure, to store electrical energy in the presence of an external electric field. Further, terms "permittivity" and the "average dielectric constant ($D_k$)" are used interchangeably within this disclosure. Permittivity is a complex quantity because it describes the phase and magnitude of polarization in relation to an oscillating field. The terms "average dielectric constant ($D_k$)" and "relative permittivity ($\varepsilon_r$)" are used interchangeably in the disclosure and are defined as the ratio between the real part of the complex permittivity and permittivity of free space.

The "loss tangent" is expressed as the ratio between the imaginary and real part of the complex permittivity. In general, the average dielectric constant and loss tangent of a material is dependent on the frequency of the external field. Therefore, the dielectric property measured in the kHz range may not represent the dielectric property at microwave frequencies. Further, unless otherwise noted, the "loss tangent" and "average dielectric constant ($D_k$)" attributes of the glass-ceramics of the disclosure can be measured at frequencies of 1 GHz or greater according to a split post dielectric resonator (SPDR) or an open-cavity resonator configuration according to techniques as understood by those with ordinary skill in the field of the disclosure. The particular method chosen can be selected based on the sample thickness and its lateral dimensions.

The present disclosure generally relates to glass-ceramic compositions and articles having a magnesium aluminosilicate glass composition with varying levels of crystalline phase(s). These glass-ceramics, including as employed in layers of laminate glass-ceramic articles, generally possess low dielectric loss characteristics. The glass-ceramics are preferably alkali-free and upon being subjected to ceramming, the minerals crystallize during heat-treatment. As a result, the remaining glass constituent is relatively silica-rich, leaving the balance closer to pure $SiO_2$, which has very good dielectric properties. The minerals may also have very good dielectric properties, and therefore, the combination of the glass and minerals contribute to the overall electrical properties of the material. For example, some aspects of the disclosure are directed to glass-ceramic compositions comprising a loss tangent of 0.001 or less for signals having a frequency of greater than 1 GHz or less than 1 GHz. In addition, these glass-ceramic compositions are generally characterized by relatively low CTE values, e.g., less than $70 \times 10^{-7}/°$ C., which can make them well-suited for use as clad layers in laminates (e.g., mechanically strengthened laminates) having core glass layers with higher CTE values (i.e., the core layers having CTE values at least that of the clad layers, or at least $70 \times 10^{-7}/°$ C.).

The magnesium aluminosilicate glass-ceramic comprises network formers $SiO_2$, $Al_2O_3$, and MgO. In some examples, $SiO_2$ may be present in a range of 40 mol. % to 80 mol. %, or in a range of 45 mol. % to 75 mol. %, or in a range of 50 mol. % to 70 mol. % (e.g., 58 mol. %), or in a range of 55 mol. % to 65 mol. %, or in a range of 60 mol. % to 70 mol. %. In some examples, $Al_2O_3$ may be present in a range of 5 mol. % to 20 mol. %, or in a range of 8 mol. % to 17 mol. %, or in a range of 10 mol. % to 15 mol. % (e.g., 14 mol. %), or in a range of 9 mol. % to 12 mol. %. In some examples, MgO may be present in a range of 5 mol. % to 20 mol. %, or in a range of 8 mol. % to 17 mol. %, or in a range of 7 mol. % to 12 mol. %, or in a range of 10 mol. % to 15 mol. % (e.g., 14 mol. %).

In some examples, $SiO_2$ may be present in a range of 40 mol. % to 80 mol. %, $Al_2O_3$ may be present in a range of 5 mol. % to 20 mol. %, and MgO may be present in a range of 5 mol. % to 20 mol. %. In some examples, $SiO_2$ may be present in a range of 55 mol. % to 75 mol. %, $Al_2O_3$ may be present in a range of 9 mol. % to 15 mol. %, and MgO may be present in a range of 7 mol. % to 15 mol. %. In some examples, $SiO_2$ may be present in a range of 60 mol. % to 70 mol. %, $Al_2O_3$ may be present in a range of 10 mol. % to 15 mol. %, and MgO may be present in a range of 10 mol. % to 15 mol. %. In some examples, $SiO_2$ may be present in a range of 60 mol. % to 70 mol. %, $Al_2O_3$ may be present in a range of 9 mol. % to 12 mol. %, and MgO may be present in a range of 7 mol. % to 12 mol. %. In some examples, $SiO_2$ may be present in a range of 55 mol. % to 65 mol. %, $Al_2O_3$ may be present in a range of 10 mol. % to 15 mol. %, and MgO may be present in a range of 10 mol. % to 15 mol. %.

In some examples, the magnesium aluminosilicate glass-ceramic comprises at least one of $B_2O_3$, ZnO, and $TiO_2$. In some examples, magnesium aluminosilicate glass-ceramic comprises at least two of $B_2O_3$, ZnO, and $TiO_2$.

In some examples, $B_2O_3$ may be present in a range of 0 mol. % to 10 mol. %, or in a range of 1 mol. % to 8 mol. %, or in a range of 2 mol. % to 5 mol. %, or in a range of 2 mol. % to 3 mol. %. In some examples, ZnO may be present in a range of 0 mol. % to 10 mol. %, or in a range of 1 mol. % to 8 mol. %, or in a range of 3 mol. % to 6 mol. %, or in a range of 4 mol. % to 5 mol. %. In some examples, $TiO_2$ may be present in a range of 0 mol. % to 10 mol. %, or in a range of 1 mol. % to 9 mol. %, or in a range of 3 mol. % to 7 mol. %, or in a range of 5 mol. % to 6 mol. %.

In some examples, $B_2O_3$ may be present in a range of 0 mol. % to 10 mol. % (e.g., 0 mol. %), ZnO may be present in a range of 3 mol. % to 6 mol. % (e.g., 5 mol. %), and $TiO_2$ may be present in a range of 3 mol. % to 7 mol. % (e.g., 6 mol. %). In some examples, $B_2O_3$ may be present in a range of 2 mol. % to 5 mol. % (e.g., 2.8 mol. % or 3 mol. %), ZnO may be present in a range of 3 mol. % to 6 mol. % (e.g., 4.4 mol. % or 5 mol. %), and $TiO_2$ may be present in a range of 3 mol. % to 7 mol. % (e.g., 5.3 mol. % or 6 mol. %).

In some examples, the magnesium aluminosilicate glass-ceramic comprises a crystalline phase at a concentration in a range of 5 wt. % to 80 wt. % of the glass-ceramic. In some examples, the crystalline phase is in a range of 10 wt. % to 75 wt. %, or in a range of 20 wt. % to 65 wt. %, or in a range of 25 wt. % to 50 wt. %, or in a range of 35 wt. % to 50 wt. %. In some examples, the crystalline phase is in a range of 5 wt. % to 75 wt. %, or in a range of 5 wt. % to 50 wt. %, or in a range of 5 wt. % to 40 wt. %, or in a range of 5 wt. % to 30 wt. %, or in a range of 5 wt. % to 25 wt. %, or in a range of 5 wt. % to 15 wt. %, or in a range of 5 wt. % to 10 wt. %.

In some examples, the magnesium aluminosilicate crystalline phase comprises at least one of $MgAl_2O_4/ZnAl_2O_4$, $MgTiO_5$, $TiO_2$, $MgSiO_3$, $ZrO_2$, $Mg_2Al_4Si_5O_{18}$, Mg-stuffed β-quartz, or $SiO_2$. In some examples, the magnesium aluminosilicate crystalline phase comprises at least two of $MgAl_2O_4/ZnAl_2O_4$, $MgTiO_5$, $TiO_2$, $MgSiO_3$, $ZrO_2$, $Mg_2Al_4Si_5O_{18}$, Mg-stuffed β-quartz, or $SiO_2$. In some examples, the magnesium aluminosilicate crystalline phase comprises at least three of $MgAl_2O_4/ZnAl_2O_4$, $MgTiO_5$, $TiO_2$, $MgSiO_3$, $ZrO_2$, $Mg_2Al_4Si_5O_{18}$, Mg-stuffed β-quartz, or $SiO_2$. In some examples, the magnesium aluminosilicate crystalline phase comprises at least $MgAl_2O_4/ZnAl_2O_4$ and $MgTiO_5$. In some examples, the magnesium aluminosilicate crystalline phase may further comprise $ZrO_2$; $TiO_2$; $SiO_2$; $MgSiO_3$; $TiO_2$ and $ZrO_2$; $TiO_2$ and $MgSiO_3$; $ZrO_2$ and $MgSiO_3$; $TiO_2$, $MgSiO_3$, and $Mg_2Al_4Si_5O_{18}$; $TiO_2$, $MgSiO_3$, and Mg-stuffed β-quartz; or $TiO_2$, $MgSiO_3$, $Mg_2Al_4Si_5O_{18}$, and Mg-stuffed β-quartz. In some examples, the Mg-stuffed β-quartz comprises a MgO to $Al_2O_3$ to $SiO_2$ ratio in a range of 1:1:2 to 1:1:8.

In some embodiments, the glass-ceramic may be formed by an up-draw process. In some embodiments, the glass-ceramic may be formed by down-draw processes such as slot-draw and fusion-draw formation processes. The fusion draw process is an industrial technique that may be used for large-scale manufacture of thin glass sheets. Compared to other flat glass manufacturing techniques, the fusion-draw process yields thin glass sheets with superior flatness and surface quality. As a result, fusion-draw may be used to fabricate thin glass substrates for liquid crystal displays, as well as for cover glass for various personal electronic devices.

The fusion draw process involves a flow of molten glass over a trough known as an "isopipe," which is typically made of zircon or other refractory materials. The molten glass overflows the top of the isopipe from both sides, meeting at the bottom of the isopipe to form a single sheet where only the interior of the final sheet has made direct contact with the isopipe. Since neither exposed surface of the final glass sheet makes contact with the isopipe material during the draw process, both outer surfaces of the glass are of pristine quality do not require subsequent finishing.

In order to be fusion drawable, a glass-ceramic composition desirably has a sufficiently high liquidus viscosity (i.e., the viscosity of a molten glass at the liquidus temperature). In some implementations of the disclosure, the glass-ceramic compositions have a liquidus viscosity of greater than 5 kPoise, greater than 10 kPoise, greater than 50 kPoise, or even greater than 100 kPoise.

A traditional fusion draw process is accomplished using a single isopipe, resulting in a homogeneous glass product. In some examples, a more complicated fusion draw process may be used to form laminate glass-ceramic articles. In a laminate fusion draw process, two isopipes are employed to form a laminated sheet comprising a core glass composition (relatively high CTE) surrounded on either or both sides by outer clad layers comprising a glass-ceramic composition. One advantage of a laminate fusion process is that when the CTE of the clad glass-ceramic is less than that of the core glass layer, the CTE differences (i.e., CTE mismatch) between the two elements results in the development of compressive stress in the outer clad layer. This compressive stress increases the strength of the final laminate glass-ceramic product without the need for additional strengthening, e.g., by an ion exchange treatment.

In some examples, two sheets of down-drawn glass-ceramic compositions of the disclosure can be laminated through a rolling process. Such compositions preferably have a liquidus viscosity from about 5 kPoise to about 10 kPoise. The sheets are rolled together, and then subjected to a 'cookie-cut' step to form the resulting laminate into a plate form.

Referring now to FIG. 1, in some embodiments, a glass-ceramic composition according to the disclosure can be employed to form a glass-ceramic laminate 100. As noted earlier, the glass-ceramic laminate 100 is exemplary; consequently, the glass-ceramic compositions of the disclosure may be employed in other articles, forms and structures (e.g., as non-laminate substrates for electronic devices, non-laminate device covers, etc.). Glass-ceramic laminate 100 comprises a core glass layer 110 surrounded by a pair of clad layers 120, each comprising a glass-ceramic composition according to the disclosure. For example, the clad layer may comprise $SiO_2$ in a range of 40 mol. % to 80 mol. %, $Al_2O_3$ in a range of 5 mol. % to 20 mol. %, MgO in a range of 5 mol. % to 20 mol. %, at least one of $B_2O_3$, ZnO, and $TiO_2$, each in a range of 0 mol. % to 10 mol. %, and all values between these concentrations.

As shown in FIG. 1, a pair of clad layers 120 are laminated to the core glass layer 110 at its primary surfaces 6, 8. Further, the core glass layer 110 of the glass-ceramic laminate 100 has a CTE that is greater than or equal to the CTE of glass-ceramic composition employed in the clad layers 120. In some examples, the glass-ceramic is configured as a two-dimensional plane having at least one minimum dimension of 1 cm.

In some implementations, exemplary glass-ceramic compositions that may be employed for clad layers 120 are provided below in Table 1 (Examples 1-8), along with their crystalline phase compositions of Table 2, loss tangents of FIGS. 2 and 4, and dielectric constant ($D_k$) values of FIGS. 3 and 5 at frequencies less than 10 GHz (for Examples 1-8) and frequencies greater than 10 GHz (for Examples 4-8).

EXAMPLES

The embodiments described herein will be further clarified by the following examples. Table 1 below describes the chemical composition of examples 1-8.

With regard to the glass-ceramic compositions presented herein, including the exemplary compositions of Table 1, each of the oxide components serves a function. Pure $SiO_2$ has a low CTE and, due to its high melting temperature, is incompatible with fusion draw processes. Accordingly, the amount of $SiO_2$ in the glass-ceramics is in a range of 40 mol. % to 80 mol. %, and all $SiO_2$ amounts between these levels. Compositions comprising $SiO_2$ to greater than about 50 mol. % may result in lower loss tangent values at 10 GHz or greater.

Alumina ($Al_2O_3$) may serve to increase the rigidity of the resulting glass-ceramic of the disclosure. Nevertheless, the $Al_2O_3$ should be carefully controlled since it may also inhibit formation of sufficient levels of the crystalline phase, which would negatively influence the loss tangent properties of the resulting glass-ceramic. Accordingly, the amount of $Al_2O_3$ in the glass-ceramics is in a range of 5 mol. % to 20 mol. %, and all $Al_2O_3$ amounts between these levels. Moreover, alkaline earth oxides, such as MgO, may serve to improve the melting behavior of the glass-ceramic compositions of the disclosure. Accordingly, the amount of MgO in the glass-ceramics is in a range of 5 mol. % to 20 mol. %, and all MgO amounts between these levels.

Network formers, $Al_2O_3$ and MgO, are included in these compositions to ensure the formation of a stable glass (prior to the development of crystals), minimize the CTE, and to facilitate melting and forming. By mixing these network formers in appropriate concentrations with $SiO_2$, it is possible to achieve a stable bulk glass, while minimizing the need for additional network modifiers, such as alkali metals oxides.

With regard to $B_2O_3$, this metal oxide may reduce viscosity of the glass and facilitate formation processes, including fusion draw formation processes. Accordingly, the amount of $B_2O_3$ in the glass-ceramics is in a range of 0 mol. % to 10 mol. %, and all $B_2O_3$ amounts between these levels. With regard to ZnO, this metal oxide may facilitate melting. Accordingly, the amount of ZnO in the glass-ceramics is in a range of 0 mol. % to 10 mol. %, and all ZnO amounts between these levels. With regard to $TiO_2$, this metal oxide serves as a nucleant for crystallization. Accordingly, the amount of $TiO_2$ in the glass-ceramics is in a range of 0 mol. % to 10 mol. %, and all $TiO_2$ amounts between these levels.

TABLE 1

| Composition | Example | | | | | | | |
|---|---|---|---|---|---|---|---|---|
| (mol. %) | 1 | 2 | 3 | 4 | 5 | 6 | 7 | 8 |
| $SiO_2$ | 66 | 66 | 58 | 70.6 | 69.6 | 68.6 | 66.7 | 64.7 |
| $Al_2O_3$ | 10 | 10 | 14 | 9.5 | 9.5 | 9.5 | 10.5 | 11.5 |
| MgO | 10 | 10 | 14 | 7.5 | 8.5 | 9.5 | 10.5 | 11.5 |
| $B_2O_3$ | 0 | 3 | 3 | 2.8 | 2.8 | 2.8 | 2.8 | 2.8 |
| ZnO | 5 | 5 | 5 | 4.4 | 4.4 | 4.4 | 4.4 | 4.4 |
| $TiO_2$ | 6 | 6 | 6 | 5.3 | 5.3 | 5.3 | 5.3 | 5.3 |

Table 2 below describes the crystalline phase composition of examples 1-8. The difference between Examples 4 and 5 and Examples 6-8 may be due to differences in blends, quantities, and sizes of the mineral phases.

TABLE 2

| Composition | Example | | | | | | | |
|---|---|---|---|---|---|---|---|---|
| (mol. %) | 1 | 2 | 3 | 4 | 5 | 6 | 7 | 8 |
| $MgAl_2O_4/ZnAl_2O_4$ | x | x | x | x | x | x | x | x |
| $MgTiO_5$ | x | x | x | x | x | x | x | x |
| $TiO_2$ | | | x | | x | x | x | x |
| $MgSiO_3$ | | | | x | | | x | x |
| $ZrO_2$ | x | x | | | | | | |

Figure 2:
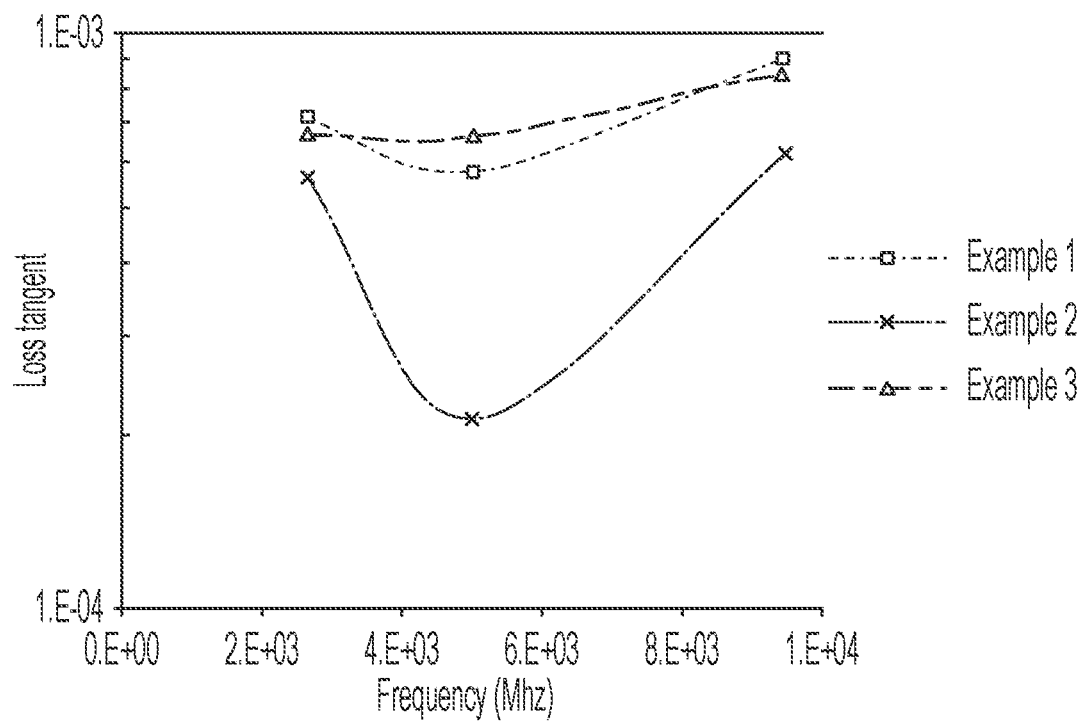
FIG. 2 illustrates loss tangent versus frequency plots for examples 1-3, according to some embodiments.
Figure 3:
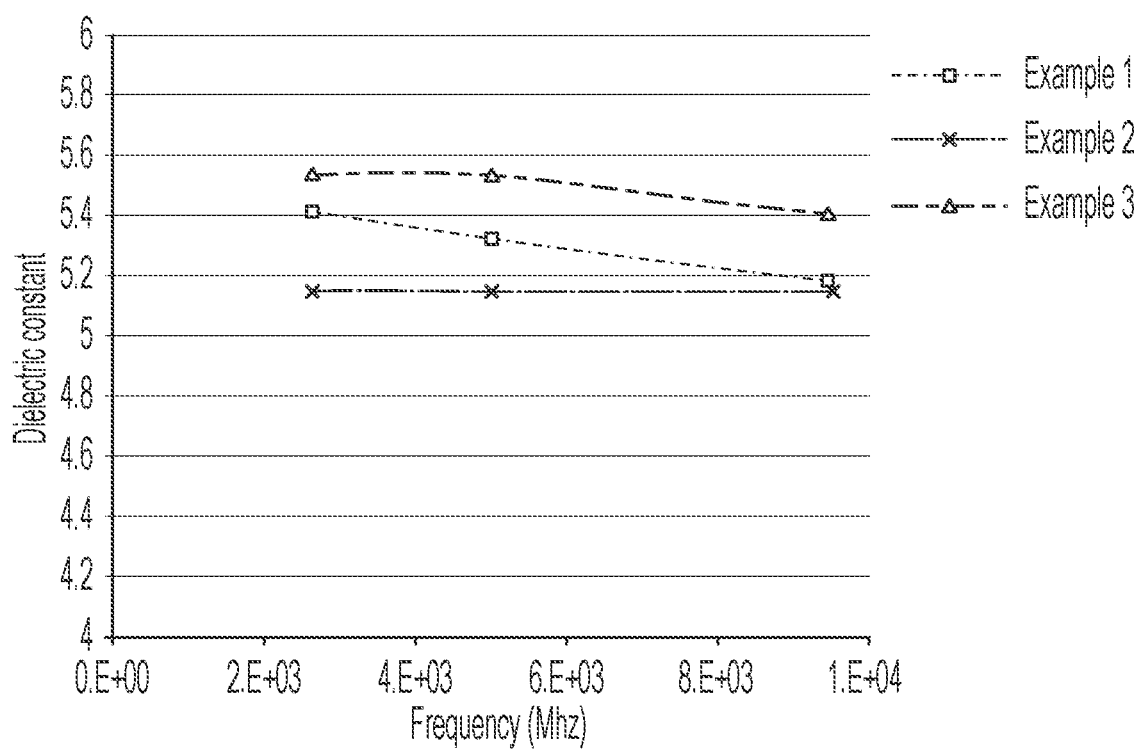
FIG. 3 illustrates dielectric constant versus frequency plots for examples 1-3, according to some embodiments.
Figure 4:
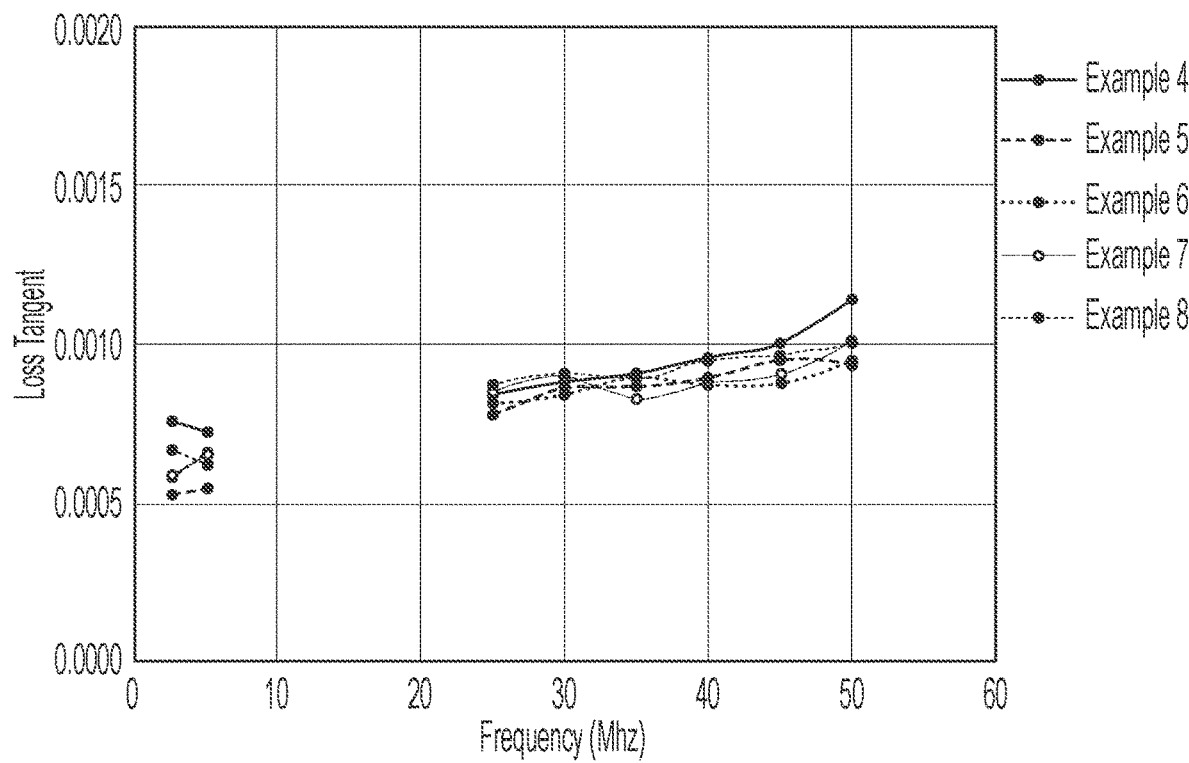
FIG. 4 illustrates loss tangent versus frequency plots for examples 4-8, according to some embodiments.
Figure 5:
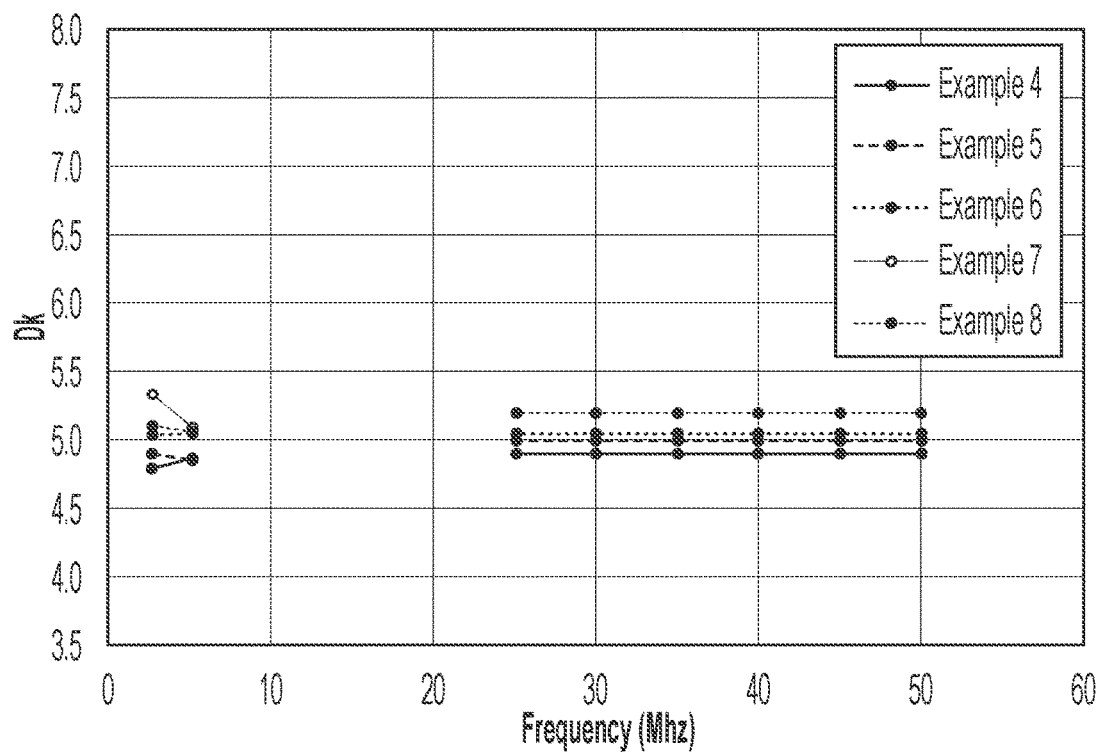
FIG. 5 illustrates dielectric constant versus frequency plots for examples 4-8, according to some embodiments.

FIGS. 2 and 4 illustrate loss tangent versus frequency plots for examples 1-3 (FIG. 2) and examples 4-8 (FIG. 4), according to some embodiments. FIGS. 3 and 5 illustrate dielectric constant versus frequency plots for examples 1-3 (FIG. 3) and examples 4-8 (FIG. 5), according to some embodiments.

Loss tangent is a quantity measuring the ability of a substance to dissipate electromagnetic energy (e.g., heat) and may be parameterized by either loss angle δ or loss tangent tan δ. Permittivity is the ability of a substance to store electrical energy in the presence of an external electric field. Permittivity is a complex quantity because it describes the phase and magnitude of polarization in relation to an oscillating field. Loss tangent is expressed as the ratio between the imaginary and real part of the complex permittivity. Dielectric constant (or relative permittivity, Cr) is defined as the ratio between the real part of the complex permittivity and permittivity of free space. In general, both dielectric constant and loss tangent of a material are dependent on the frequency of the external field.

As is seen in FIGS. 2 and 3, Examples 1-3 all exhibit loss tangents of below 0.001 for frequency signals below 1 GHz and a dielectric constant below 5.6, thereby operational with current wireless operating frequencies, which are typically below 10 GHz. However, as stated above, next generation devices are expected to achieve data rates that would result in expanding signal transmission and receiving frequencies to the tens of GHz. FIGS. 4 and 5 exemplify next generation materials which are able to achieve comparable electrical performance as that observed for Examples 1-3 at low frequencies below 10 GHz and at higher frequencies above 25 GHz. Aside from Example 4 at 50 GHz, all of the examples within a frequency range of 25 GHz and 50 GHz have a loss tangent below 0.001, as well as dielectric constants below 5.5, and in some examples, below 5.0.

Figure 6:
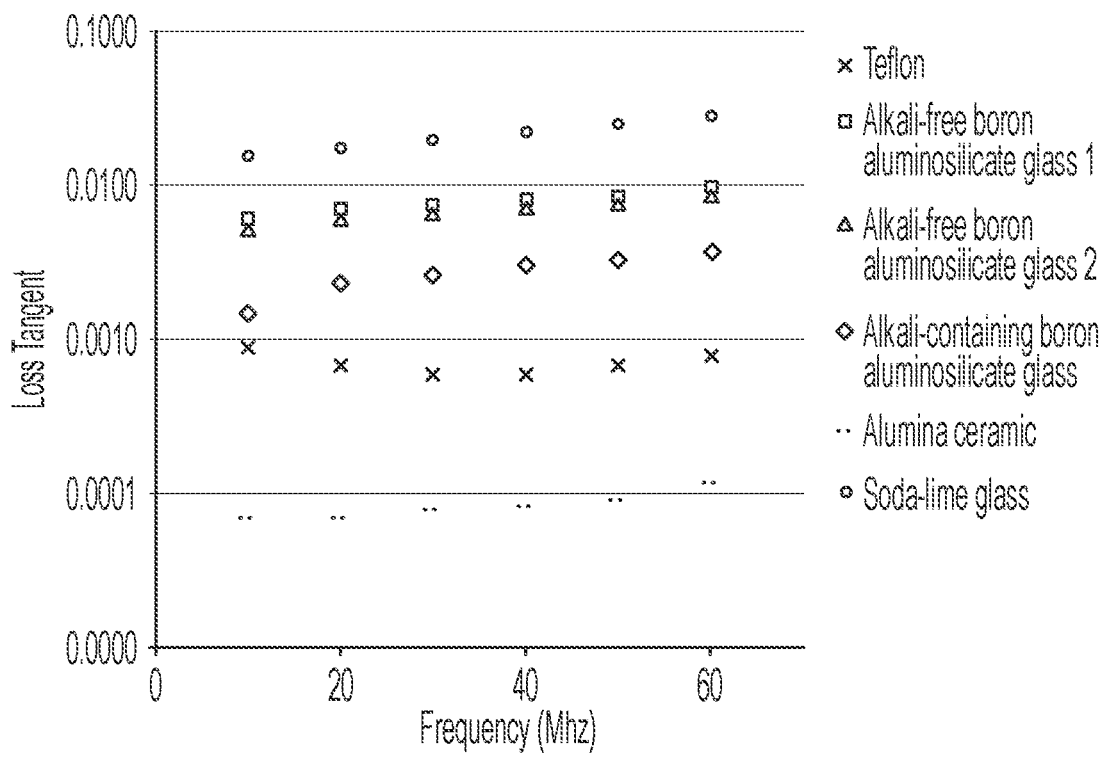
FIG. 6 illustrates loss tangent versus frequency plots for comparative examples, according to some embodiments.
Figure 7:
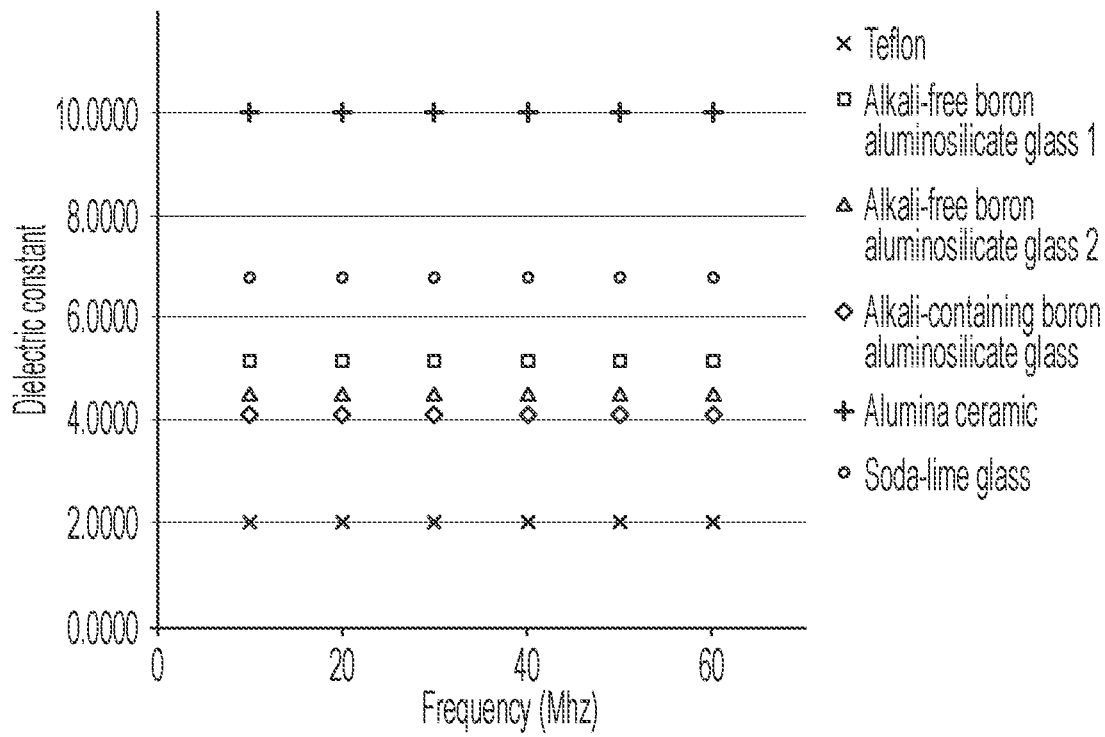
FIG. 7 illustrates dielectric constant versus frequency plots for comparative examples, according to some embodiments.

Loss tangents (FIG. 6) and dielectric constants (FIG. 7) were measured for Comparative Examples, according to some embodiments. As is seen in FIG. 6, pure glass samples (e.g., alkali-containing and alkali-free boron aluminosilicate glasses and soda-lime glass) have a loss tangent that not only exceeds 0.001 at 10 GHz, but steadily increases when exposed to higher frequencies up to 60 GHz. In particular, for the alkali-free boron aluminosilicate glasses and soda-lime glass, the loss tangents near or even exceed 0.01, or ten times higher than the loss tangents measured for Examples 4-8. While the alkali-containing boron aluminosilicate glass has a slightly lower loss tangent (though still measurably higher than 0.001), the alkali components have been shown to undesirably diffuse into subsequently-deposited thin films to negatively affect device performance.

Alumina ceramic does show a loss tangent below or only slightly above 0.0001 for the entire range of frequencies, but does not have an appropriately low dielectric constant, which is about 10 between 10 GHz and 60 GHz (as compared to under 5.5 for Examples 4-8). High dielectric constant materials are generally not suitable for continued scaling of microelectronic devices. For example, signal reflection may be controlled by dielectric constant. In laminates such as those described herein, structures generating low reflection may be attained by combining a low-dielectric glass-ceramic clad and a high-dielectric glass core. Thus, the high-dielectric alumina directly opposes the desired function of the clad layers. Teflon shows a low loss tangent below 0.001 has a dielectric constant of approximately 2 for the entire range of frequencies. However, as explained above, wireless devices are moving away from polymer-based materials, which degrade at high temperatures and are difficult to adhere with metal films in antennas, semiconductor circuits and signal transmission structures of the electronic device.

Figure 8:
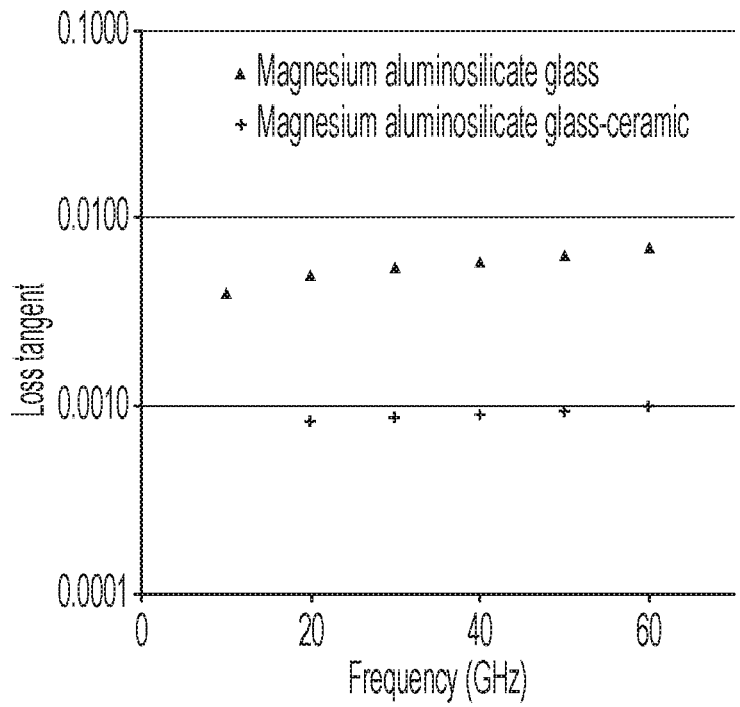
FIG. 8 illustrates loss tangent versus frequency plots for a magnesium aluminosilicate glass composition and a magnesium aluminosilicate glass-ceramic composition, according to some embodiments.
Figure 9:
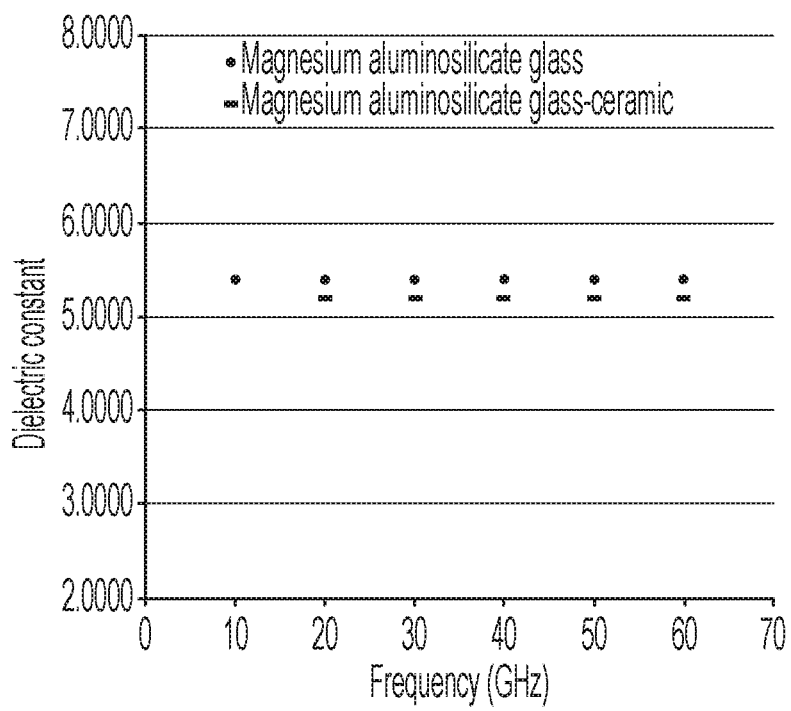
FIG. 9 illustrates dielectric constant versus frequency plots for a magnesium aluminosilicate glass composition and a magnesium aluminosilicate glass-ceramic composition, according to some embodiments.

FIGS. 8 and 9 illustrate loss tangent versus frequency and dielectric constant versus frequency plots for a magnesium aluminosilicate glass composition and a magnesium aluminosilicate glass-ceramic composition, respectively, according to some embodiments. While both have relatively similar compositions, the crystalline phase of the glass-ceramic composition was derived, in some examples, from a ceramming process that involves heating the glass-ceramic at a nucleation temperature in a range of 750° C. to 1150° C. for a time in a range of 1 hr to 10 hrs. In some examples, a first step involves mixing a plurality of oxides (e.g., $SiO_2$, $Al_2O_3$, MgO, $B_2O_3$, ZnO, or $TiO_2$) to form a precursor composition. Thereafter, the precursor composition is melted at a temperature of at least 1500° C. for a time in a range of 1 hr to 24 hrs. In some examples, the melting is conducted at a temperature of at least 1600° C. (e.g., 1650° C.). In some examples, the melting is conducted for a time in a range of 4 hrs to 20 hrs (e.g., 16 hrs), or in a range of 8 hrs to 12 hrs.

After the melting, the melt is drigaged in a process whereby to reduce time and energy necessary to comminute the glass to finely-divided particles, the melts (i.e., molten glass) are poured from the melting furnace as fine streams into a bath of water to rapidly quench the glass. As a result, the stream of molten glass may be broken into small fragments which can thereafter be milled to a desired particle size. In some examples, the stream of molten glass may be subjected between metal rollers to form thin ribbons of glass which are then crushed and milled to the desired particle size. In some examples, the mixing and melting are repeated a plurality of times prior to drigaging.

In some examples, after drigaging, an annealing is optionally conducted at a temperature of at least 500° C., at least 600° C., at least 700° C. (e.g., 750° C.), or at least 800° C. In some examples, the samples may be immediately quenched in water. The particles of glass are then re-melted at the same or similar conditions as the previous melting (described above) and poured and annealed.

Finally, ceramming may be conducted at a nucleation temperature in a range of 750° C. to 1150° C. for a time in a range of 1 hr to 10 hrs. In some examples, ceramming may be conducted at a nucleation temperature in a range of 800° C. to 1100° C., or in a range of 850° C. to 1050° C., or in a range of 900° C. to 1000° C. (e.g., 950° C.), and all values between these temperatures. In some examples, ceramming may be conducted at a nucleation temperature of 800° C., or 850° C., or 900° C., or 950° C., or 1000° C. In some examples, ceramming can include multiple heat treatments at differing temperatures and durations between about 750° C. and about 1150° C. for about 1 to about 10 hours.

In some examples, ceramming may be conducted for a time in a range of 2 hrs to 12 hrs, or in a range of 3 hrs to 9 hrs (e.g., 4 hrs), or in a range of 4 hrs to 8 hrs, and all values between these times. In some examples, ceramming may be conducted for a time 2 hrs, or 3 hrs, or 4 hrs, or 5 hrs, or 6 hrs. In some examples, ceramming is conducted at a nucleation temperature in a range of 800° C. to 1000° C. for a time in a range of 2 hrs to 6 hrs.

In some examples, the ceramming may be followed by a crystal growth treatment at 1000° C. to 1100° C. for about 2 hours (i.e., to form a crystalline phase). In some examples, ceramming may be conducted at 850° C. for 2 hrs, followed by a heat treatment at 900° C. with a 4 hr hold or 950° C. with a 4 hr hold. In some examples, the crystal growth treatment may be conducted at a temperature in a range of 750° C. to 1350° C., or in a range of 800° C. to 1300° C., or in a range of 850° C. to 1250° C., or in a range of 900° C. to 1200° C., or in a range of 950° C. to 1150° C., or in a range of 1000° C. to 1100° C., and all values between these temperatures.

X-ray diffraction (XRD) measurements were performed to identify the crystallized phases. Dielectric properties were measured on glass-ceramic subjected to ceramming conditions of 950° C. for 4 hrs on polished samples that were 3 in×3 in or 5 in×5 in and less than 1 mm thick. As shown in Table 2, at least the following minerals were observed: $MgAl_2O_4$/$ZnAl_2O_4$, $MgTiO_5$, $TiO_2$, $MgSiO_3$, or $ZrO_2$.

Referring back to FIGS. 8 and 9, the magnesium aluminosilicate glass has a comparable, but slightly higher, dielectric constant as compared with the related glass-ceramic which has undergone the above-described treatment. Similar to the loss tangents seen for boron aluminosilicate glasses of FIG. 6, the loss tangent for magnesium aluminosilicate glasses steadily increases and approaches 0.01 within the entire frequency range between 10 GHz (about 0.006) to 60 GHz (about 0.009). Thus, at higher frequencies—where electronic devices will operate to handle data connectivity and processing rates of tens of Gbits/sec—the loss tangents of magnesium aluminosilicate glasses are almost ten times higher than the loss tangents measured for magnesium aluminosilicate glass-ceramic. The presence of crystalline minerals, such as $MgAl_2O_4$/$ZnAl_2O_4$, $MgTiO_5$, $TiO_2$, $MgSiO_3$, $ZrO_2$, $Mg_2Al_4Si_5O_{18}$, Mg-stuffed β-quartz, $SiO_2$ function to lower the loss tangent of the magnesium aluminosilicate glass.

In some examples, the glass-ceramic is configured for a dielectric loss of 0.001 or less for signals having a frequency of 1 GHz or less. In some examples, the glass-ceramic is configured for a dielectric loss of 0.001 or less for signals having a frequency of 10 GHz or less. In some examples, the glass-ceramic is configured for a dielectric loss of 0.001 or less for signals having a frequency of 10 GHz or more. In some examples, the glass-ceramic is configured for a dielectric loss of 0.001 or less for signals having a frequency in a range of 25 GHz to 50 GHz. In some examples, the glass-ceramic is configured for a dielectric constant below 6.0.

In some examples, the glass-ceramics of the disclosure can include at least one fining agent such as $SnO_2$, $CeO_2$, $As_2O_3$, $Sb_2O_3$, $Cl^-$, $F^-$, or the like in small concentrations to aid in reducing or otherwise eliminating gaseous inclusions during melting. In some examples, the glass-ceramic may include a $SnO_2$ fining agent in a range of 0.005 mol % to 0.7 mol %, or 0.005 mol % to 0.5 mol %, or 0.005 mol % to 0.2 mol %.

Thus, as presented herein, glass-ceramic compositions and glass-ceramic articles are disclosed which are suitable for electronic devices, electronic device substrates, and other comparable applications that can enable higher frequency communication in devices without a significant reduction in performance as it relates to other non-electrical device requirements. For instance, as higher frequency communication signals are used in these devices, the signals must pass through various physical barriers that otherwise attenuate or block these signals. As such, the glass-ceramic compositions and articles of the disclosure can be well-suited for use as these barriers. Examples of these physical barriers are: electrically-insulating substrates that are used in the fabrication of electronic circuits such as antennas, semiconductor circuits and signal transmission structures; and device covers and other related structures that can be employed to house circuits and other electronic device components employed in electronic devices operating at high signal frequencies.

One advantage of the compositions and method of forming thereof is that an improved signal reflection performance is observed. For example, since signal reflection is controlled by dielectric constant, laminates formed using down draw methods described herein, can be used generate structures with low reflection by combining a low-dielectric clad and a high-dielectric core. Furthermore, compressive stresses may be used to increase mechanical strength of the laminates relative to traditional technologies, such as tempered soda-lime glass. The glass-ceramics disclosed herein also offer the advantage in scaling, as structures may be formed having sheet dimensions on the order of meters versus being limited to centimeters for conventional materials such as ceramics. Thus, glass-ceramics of this application may be stand-alone substrates (e.g., translucent, opaque, or with added colorants).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A glass-ceramic, comprising:
    $SiO_2$ in a range of 40 mol. % to 80 mol. %;
    $Al_2O_3$ in a range of 5 mol. % to 20 mol. %;
    MgO in a range of 5 mol. % to 20 mol. %; and
    at least one of $B_2O_3$, ZnO, and $TiO_2$, each in a range of 0 mol. % to 10 mol. %,
    wherein the glass-ceramic further comprises a magnesium aluminosilicate crystalline phase at a concentration in a range of 5 wt. % to 80 wt. % of the glass-ceramic, the magnesium aluminosilicate crystalline phase comprising $MgAl_2O_4/ZnAl_2O_4$.

2. The glass-ceramic of claim 1, comprising:
    $SiO_2$ in a range of 55 mol. % to 75 mol. %;
    $Al_2O_3$ in a range of 9 mol. % to 15 mol. %; and
    MgO in a range of 7 mol. % to 15 mol. %.

3. The glass-ceramic of claim 1, comprising:
    at least two of $B_2O_3$, ZnO, and $TiO_2$, each in a range of 0 mol. % to 10 mol. %.

4. The glass-ceramic of claim 1, wherein the magnesium aluminosilicate crystalline phase further comprises at least one of $MgTiO_5$, $TiO_2$, $MgSiO_3$, $ZrO_2$, $Mg_2Al_4Si_5O_{18}$, Mg-stuffed β-quartz, or $SiO_2$.

5. The glass-ceramic of claim 4, wherein the magnesium aluminosilicate crystalline phase further comprises at least two of $MgTiO_5$, $TiO_2$, $MgSiO_3$, $ZrO_2$, $Mg_2Al_4Si_5O_{18}$, Mg-stuffed β-quartz, or $SiO_2$.

6. The glass-ceramic of claim 4, wherein the magnesium aluminosilicate crystalline phase further comprises at least three of $MgTiO_5$, $TiO_2$, $MgSiO_3$, $ZrO_2$, $Mg_2Al_4Si_5O_{18}$, Mg-stuffed β-quartz, or $SiO_2$.

7. The glass-ceramic of claim 4, wherein the magnesium aluminosilicate crystalline phase further comprises $MgTiO_5$.

8. The glass-ceramic of claim 7, wherein the magnesium aluminosilicate crystalline phase further comprises: $ZrO_2$; $TiO_2$; $MgSiO_3$; $TiO_2$ and $ZrO_2$; $TiO_2$ and $MgSiO_3$; $ZrO_2$ and $MgSiO_3$; $TiO_2$, $MgSiO_3$, and $Mg_2Al_4Si_5O_{18}$; $TiO_2$, $MgSiO_3$, and Mg-stuffed β-quartz; or $TiO_2$, $MgSiO_3$, $Mg_2Al_4Si_5O_{18}$, and Mg-stuffed β-quartz.

9. The glass-ceramic of claim 1, wherein the glass-ceramic is configured for a dielectric loss of 0.001 or less for signals having a frequency of 1 GHz or less.

10. The glass-ceramic of claim 1, wherein the glass-ceramic is configured for a dielectric loss of 0.001 or less for signals having a frequency of 10 GHz or less.

11. The glass-ceramic of claim 1, wherein the glass-ceramic is configured for a dielectric loss of 0.001 or less for signals having a frequency of 10 GHz or more.

12. The glass-ceramic of claim 11, wherein the glass-ceramic is configured for a dielectric loss of 0.001 or less for signals having a frequency in a range of 25 GHz to 60 GHz.

13. The glass-ceramic of claim 1, wherein the glass-ceramic is configured for a dielectric constant below 6.0.

14. The glass-ceramic of claim 1, wherein the glass-ceramic is configured as a two-dimensional plane having at least one minimum dimension of 1 cm.

15. An antenna, semiconductor circuit, or signal transmission structure comprising the glass-ceramic of claim 1.

16. A glass-ceramic, comprising:
    $SiO_2$ in a range of 40 mol. % to 80 mol. %;
    $Al_2O_3$ in a range of 5 mol. % to 20 mol. %;
    MgO in a range of 5 mol. % to 20 mol. %; and
    at least one of $B_2O_3$, ZnO, and $TiO_2$, each in a range of 0 mol. % to 10 mol. %,
    wherein the glass-ceramic further comprises a magnesium aluminosilicate crystalline phase at a concentration in a range of 5 wt. % to 80 wt. % of the glass-ceramic, the magnesium aluminosilicate crystalline phase comprising $MgTiO_5$.

17. The glass-ceramic of claim 16, comprising:
    $SiO_2$ in a range of 55 mol. % to 75 mol. %;
    $Al_2O_3$ in a range of 9 mol. % to 15 mol. %; and
    MgO in a range of 7 mol. % to 15 mol. %.

18. The glass-ceramic of claim 16, comprising:
    at least two of $B_2O_3$, ZnO, and $TiO_2$, each in a range of 0 mol. % to 10 mol. %.

19. The glass-ceramic of claim 16, wherein the magnesium aluminosilicate crystalline phase further comprises at least one of $MgAl_2O_4/ZnAl_2O_4$, $TiO_2$, $MgSiO_3$, $ZrO_2$, $Mg_2Al_4Si_5O_{18}$, or Mg-stuffed β-quartz.

20. The glass-ceramic of claim 19, wherein the magnesium aluminosilicate crystalline phase further comprises at least two of $MgAl_2O_4/ZnAl_2O_4$, $TiO_2$, $MgSiO_3$, $ZrO_2$, $Mg_2Al_4Si_5O_{18}$, or Mg-stuffed β-quartz.

* * * * *

UNITED STATES PATENT AND TRADEMARK OFFICE
CERTIFICATE OF CORRECTION

| | | |
|---|---|---|
| PATENT NO. | : 11,332,405 B2 | Page 1 of 1 |
| APPLICATION NO. | : 17/262923 | |
| DATED | : May 17, 2022 | |
| INVENTOR(S) | : George Halsey Beall et al. | |

It is certified that error appears in the above-identified patent and that said Letters Patent is hereby corrected as shown below:

In the Specification

In Column 1, Line 14, delete "their its" and insert -- their --.

Signed and Sealed this
Fifteenth Day of October, 2024

Katherine Kelly Vidal
*Director of the United States Patent and Trademark Office*